United States Patent
Bock et al.

(10) Patent No.: US 11,801,949 B2
(45) Date of Patent: Oct. 31, 2023

(54) FIELD EMISSION PROPULSION SYSTEM AND METHOD FOR CALIBRATING AND OPERATING A FIELD EMISSION PROPULSION SYSTEM

(71) Applicant: Morpheus Space GmbH, Dresden (DE)

(72) Inventors: Daniel Bock, Dresden (DE); Martin Tajmar, Dresden (DE); Philipp Laufer, Dresden (DE)

(73) Assignee: MORPHEUS SPACE GmbH, Dresden (DE)

( * ) Notice: Subject to any disclaimer, the term of this patent is extended or adjusted under 35 U.S.C. 154(b) by 821 days.

(21) Appl. No.: 16/777,079

(22) Filed: Jan. 30, 2020

(65) Prior Publication Data
US 2020/0223564 A1 Jul. 16, 2020

Related U.S. Application Data

(63) Continuation of application No. PCT/EP2018/089251, filed on May 16, 2018.

(30) Foreign Application Priority Data

Jul. 31, 2017 (DE) .......................... 102017117316.1

(51) Int. Cl.
*B64G 1/40* (2006.01)
*F03H 1/00* (2006.01)
*H01J 27/26* (2006.01)

(52) U.S. Cl.
CPC ............. *B64G 1/405* (2013.01); *F03H 1/005* (2013.01); *H01J 27/26* (2013.01)

(58) Field of Classification Search
CPC ....................................................... F03H 1/005
See application file for complete search history.

(56) References Cited

U.S. PATENT DOCUMENTS

| 4,733,530 A | * | 3/1988 | Beattie | .................. | F01K 21/047 |
| | | | | | 315/307 |
| 2008/0072565 A1 | * | 3/2008 | Bekey | ..................... | F03H 1/005 |
| | | | | | 60/203.1 |

(Continued)

FOREIGN PATENT DOCUMENTS

WO   2004057643 A2   7/2004

OTHER PUBLICATIONS

Tajmar "Survey on FEEP Neutralizer Options" (Year: 2002).*

(Continued)

*Primary Examiner* — Arun Goyal
*Assistant Examiner* — William L Breazeal
(74) *Attorney, Agent, or Firm* — Gregory L. Mayback; Mayback IP Law, P.A.

(57) ABSTRACT

A field emission propulsion system for a spacecraft includes a control unit, a propulsion assembly, and a plurality of extractor electrode voltage sources. The propulsion assembly comprises a plurality of field emission propulsion units having an ion source with a plurality of ion emitters and extractor electrodes associated with the ion emitters and disposed in a field arrangement. The plurality of extractor electrode voltage sources, each associated with the extractor electrodes to control the same, are controlled by the control unit using an individual extractor electrode voltage.

15 Claims, 5 Drawing Sheets

(56) References Cited

U.S. PATENT DOCUMENTS

2010/0251690 A1* 10/2010 Kueneman .............. F03H 1/005
  60/202
2016/0010631 A1* 1/2016 King .................. F03H 1/005
  60/202

OTHER PUBLICATIONS

International Search Report of PCT/EP2018/069251 dated Nov. 13, 2018.
Tajmar, et al., Development of Electric and Chemical Microthrusters, Hindawi Publishing Corporation, International Journal of Aerospace Engineering, vol. 2011, Jan. 1, 2011, Article ID 361215, XP002696717, DOI: 10.1155/2011/361215.
Vasiljevich, et al., Development of an Indium mN-FEEP Thruster, 44th AIAA/ASME/SAE/ASEE Joint Propulsion Conference and Exhibit, Jul. 21-23, 2008, Hartford, CT, Copyright 2008 by Austrian Research Centers GMBH—ARC. Published by the American Institute of Aeronaulics and Astronautics, Inc., with permission.
Velasquez-Garcia, et al., "A Planar Array of Micro-Fabricated Electrospray Emitters for Thruster Applications", Journal of Microelectromechanical Systems., vol. 15, No. 5, Oct. 30, 2006, pp. 1272-1280, XP055365333, US.
Electro-Optical Systems, Final Report for Colloid Thruster Technology, Contract No. NAS 5-21025 (Aug. 1970-Sep. 1971), 136 p.
Bock, et al., Highly Miniaturized FEEP Propulsion system (NanoFEEP) for Attitude and Orbit Control of CubeSats, 67th International Astronautical congress (IAC), Guadalajara, mexico, Sep. 26-30, 2016. Copyright 2016 by the International Astronautical Federation (IAF).
Timmerman, et al., Hardware and Software Design of the Microthrust Power and Control System, MicroThrust project, grant agreement No. 263035, funded by the EC Seventh Framework Program theme FP7-SPACE-2010, CE-MS-2014-05 p. 86; The 33rd International Electric Propulsion Conference, the George Washington University, USA Oct. 6-10, 2013.

* cited by examiner

FIELD EMISSION PROPULSION SYSTEM AND METHOD FOR CALIBRATING AND OPERATING A FIELD EMISSION PROPULSION SYSTEM

CROSS-REFERENCE TO RELATED APPLICATIONS

This is a continuing application, under 35 U.S.C. § 120, of copending international application No. PCT/EP2018/069251, filed Jul. 16, 2018, which designated the United States and was not published in English; this application also claims the priority, under 35 U.S.C. § 119, of German patent application No. 10 2017 117 316.1, filed Jul. 31, 2017; the prior applications are herewith incorporated by reference in their entirety.

STATEMENT REGARDING FEDERALLY SPONSORED RESEARCH OR DEVELOPMENT

Not Applicable

FIELD OF THE INVENTION

The disclosure relates to field emission propulsions for a spacecraft and to methods for operating a field emission propulsion.

BACKGROUND OF THE INVENTION

A number of different propulsion technologies are known for a spacecraft, such as chemical propulsions, cold gas propulsions, gas ion propulsions, plasma propulsions and the like. These propulsion technologies have the disadvantage that they may not be miniaturized satisfactorily for smaller satellites due to physical or efficiency reasons. However, the increasing use of very small satellites requires the provision of suitable propulsion technologies with high efficiency. In particular, field emission propulsions are especially suitable for use in very small satellites due to their very high specific pulses of several 1,000 s.

For example, document AMR Propulsions Innovations, "IFM Nano Thruster", data sheet, Jul. 26, 2017, http://www.propulsion.at, discloses a field emission propulsion which uses a liquid metal ion source with several liquid metal ion emitters. Since only one common extractor electrode is used for all liquid metal ion emitters, the individual emitters may not be controlled individually.

Also, due to manufacturing tolerances, the individual emitters do not ignite simultaneously and they ignite in an uncontrolled sequence. In addition, each of the liquid metal ion emitters has an individual emission behavior, such that the field arrangement of the liquid metal ion emitters usually produces an unpredictable thrust vector.

In addition, Bock, D., Tajmar, M., "Highly Miniaturized FEEP Propulsion System (NanoFEEP) for Attitude and Orbit Control of CubeSats", Proceedings of the 67th International Astronautical Congress (IAC), IAC-16-C4.6.5, Sep. 26 to 30, 2016, Guadalajara, Mexico, have published a field emission propulsion system for a very small satellite.

A field emission propulsion system and a method for its operation are provided that are suitable for use in very small satellites, achieving high efficiency and operating with low losses. In addition, a variable thrust range of several orders of magnitude is to be achieved. to the systems and methods described control the ignition sequence and compensate for a varying thrust vector or enable active control of the thrust vector in order to enable controlled operation of the propulsion system.

SUMMARY OF THE INVENTION

According to one embodiment a field emission propulsion system for a spacecraft is provided, comprising:
  a control unit;
  a propulsion assembly having a plurality of field emission propulsion units comprising an ion source having a plurality of ion emitters and extractor electrodes associated with the ion emitters and arranged in a field arrangement;
  a plurality of extractor electrode voltage sources, which are each assigned to the extractor electrodes, in order to control them by the control unit with an individual extractor electrode voltage.

The above field emission propulsion system comprises a field arrangement of several ion emitters, each of which is assigned an extractor electrode. The ion emitter may be assigned a common emitter voltage or a common emitter voltage potential, while the extractor electrodes are electrically isolated from each other and may be controlled by means of extractor electrode voltage sources with individually adjustable extractor electrode voltages and with individually adjustable extractor electrode voltage potentials, respectively.

In addition, the control unit may be configured to adjust the field strength of an electric field between the ion emitters and the associated extractor electrode to a specific extractor electrode voltage corresponding to a predetermined level of an ion current. The specific extractor electrode voltage for at least one specific propulsion unit is determined in a calibration method by measuring a current-voltage characteristic of the respective propulsion unit by measuring an emitter current through the ion emitter with the other propulsion units deactivated at the same time at different voltage differences between the extractor electrode and the ion emitters, and by adjusting the extractor electrode voltage or the extractor electrode voltage potential in such a way that an emitter current which corresponds to the predetermined level of the ion current is produced.

The above calibration method therefore provides to control the extractor electrodes of the field emission propulsion units individually with varying voltage differences between the respective extractor electrode and the respective ion emitters and simultaneously measuring a current flow from the emitter voltage source in order to measure a characteristic of the corresponding ion emitter. Thus, a voltage-dependent ion current may be determined for each ion emitter, such that a desired level of the ion current may be specifically set by adjusting the respective extractor electrode voltage or the respective extractor electrode voltage potential, respectively. Thus, ion emitters in a field arrangement may be assigned the same emitter voltage (with the same emitter voltage potential), and the extractor electrodes assigned to the ion emitters may be individually controlled to adjust the ion current of each individual ion emitter. Since the ion emitters are at the same voltage potential, they may be operated with the same emitter voltage source or with a common potential source, thereby reducing losses during high-voltage generation and reducing the installation space and mass of the overall system. Alternatively, the extractor electrode voltage sources for each of the extractor electrodes may be connected to each other and to the ion emitters with their positive potential terminal. The separate control of the extractor electrodes also allows for more precise adjustment of the thrust and direction of thrust of the propulsion assembly.

Furthermore, a current measuring unit may be provided which is configured to measure an electric current flowing from one of the ion emitters, from several of the ion emitters or from all ion emitters and/or into the extractor electrode.

According to one embodiment, at least one of the extractor electrodes may be formed with two, three, four or more than four electrically isolated extractor electrode segments, which together form a particularly annular shaped extractor electrode, wherein the extractor electrode voltage source is configured to provide the extractor electrode segments with individual segment voltages, such that a predetermined direction of the emitted ion beam is adjusted in operation, and/or wherein separate segment voltage sources are provided for a plurality of the extractor electrode segments to provide the extractor electrode segments with individual segment voltages such that a predetermined direction of the ion beam is adjusted in operation.

Preferably, the extractor electrodes are each composed of several electrically isolated extractor electrode segments, which in turn may be controlled with different segment voltages. The levels of the individual segment voltages are based on an extractor electrode voltage to be applied or an extractor electrode voltage potential to be applied.

In particular, the segment voltages may be adjusted by separate segment voltage sources, by voltage dividers, which generate segment voltages by dividing the extractor electrode voltage assigned to the respective extractor electrode, or by adjustable series resistors of the extractor electrode segments.

This allows for compensation of possible misalignment of a resulting thrust beam during operation due to component tolerances or the like. Due to the possibility of selecting different segment voltages, the requirements on the component tolerances for the propulsion units may be greatly reduced, since alignment errors of the resulting thrust beam or geometrical alignment errors of the ion emitters to the extractor electrodes may be actively compensated.

By repeating the calibration process at regular intervals, undesired changes in the ion emission behavior of the individual ion emitters may be detected and, if necessary, compensated during long-term operation.

Furthermore, a neutralizer may be provided to supply an electron current of controllable strength.

According to one embodiment, the ion source of the propulsion assembly may comprise a fuel tank for a liquid or liquefiable electrically conductive fuel, wherein the fuel may be ejected for field ionization at the tips of the ion emitters facing the respective extractor electrode.

Preferably, the extractor electrodes are annular shaped with a central opening arranged concentrically with respect to an extension direction of the ion emitters.

According to one embodiment, the extractor electrodes may be supported by an extraction plate and electrically insulated from each other, wherein the extraction plate is made of non-conductive material, preferably.

Furthermore, the extractor electrode voltage sources may each have an adjustable voltage divider to provide an adjustable extractor electrode voltage.

Preferably, one, at least one, several or each of the extractor electrodes comprises, along a full or partial circumference, an electrically conductive first shielding structure projecting in the direction of the ion emitters, and/or one, at least one or each of the extractor electrodes comprises, along a full or partial circumference, an electrically conductive second shielding structure projecting in the direction facing away from the ion emitters.

The above described method is based on a field emission propulsion system with a common emitter electrode and separate extractor electrodes which may be controlled separately with individual extraction potentials.

According to a further aspect, a method for calibrating the above described field emission propulsion system is provided, wherein a field strength of an electric field between the ion emitters and the respective associated extractor electrode may be set for each of the several field emission propulsion units to an extractor electrode voltage corresponding to a predetermined ion current to be adjusted, which results from a current-voltage characteristic of the field emission propulsion units and the predetermined ion current to be adjusted of a respective one of the several propulsion units, comprising the following steps:

for each of the field emission propulsion units, measuring a current-voltage characteristic by measuring an emitter current through the ion emitter of the field emission propulsion unit, with remaining field emission propulsion units simultaneously deactivated or operated with constant current at different extractor electrode voltages;

setting the extractor electrode voltages for each of the field emission propulsion units depending respectively on the current-voltage characteristic and the predetermined ion current so as to produce an emitter current of the respective field emission propulsion units corresponding to the predetermined ion current to be adjusted.

According to a further aspect, a method of operating the above described field emission propulsion system is provided, wherein a field strength of an electric field between the ion emitters and the respective associated extractor electrode is adjustable for each of the plurality of field emission propulsion units to an extractor electrode voltage corresponding to a predetermined ion current to be adjusted resulting from a current-voltage characteristic and the predetermined ion current to be adjusted of a respective one of the plurality of field emission propulsion units, wherein a predetermined thrust vector of the field emission propulsion system is set by controlling each of the field emission propulsion units with an individual extractor electrode voltage such that the predetermined thrust vector results as the sum of the ion currents from the field emission propulsion units.

BRIEF DESCRIPTION OF THE DRAWINGS

The following drawings provide a more detailed explanation of the various embodiments, wherein.

DETAILED DESCRIPTION OF THE EMBODIMENTS

Figure 1:
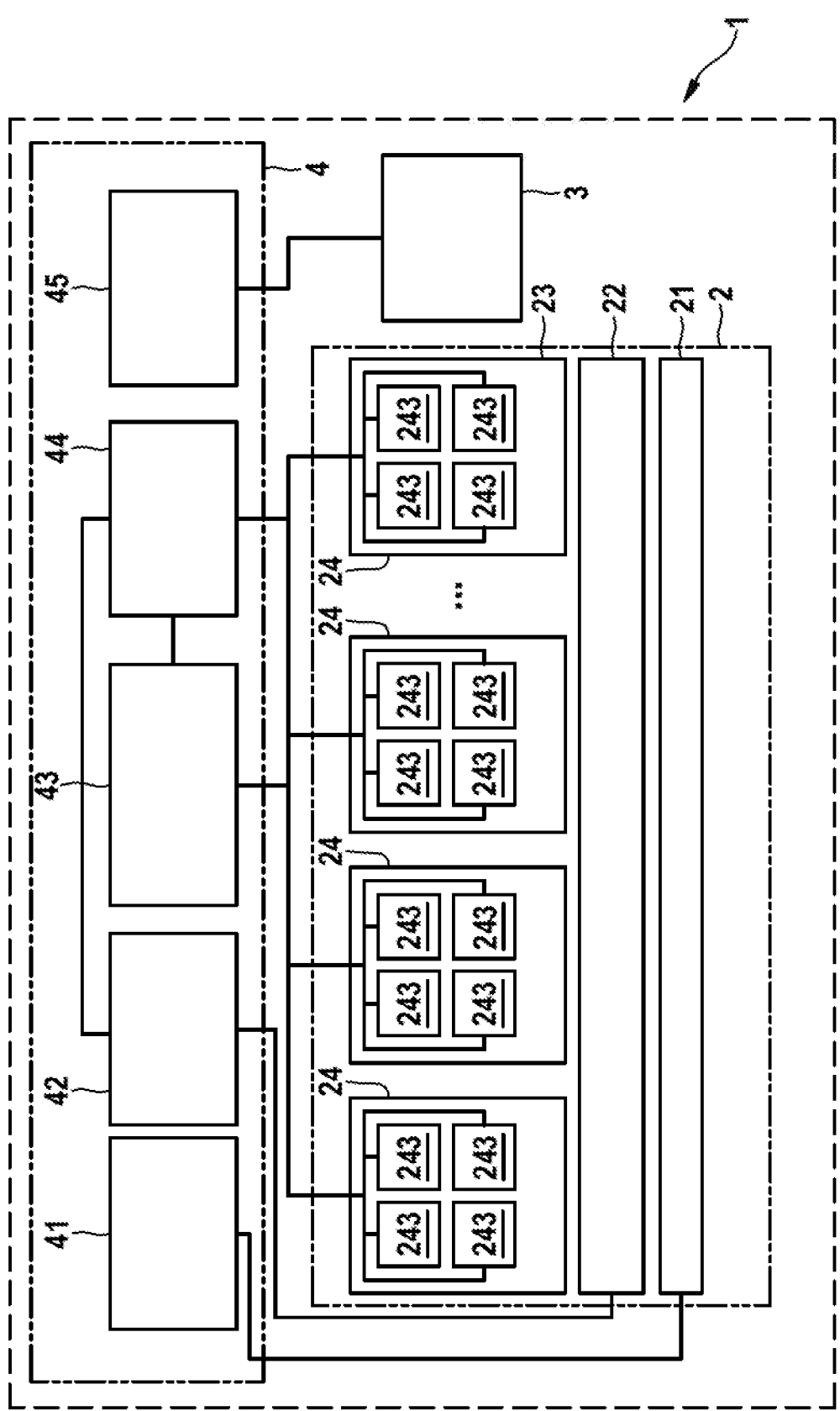
FIG. 1 illustrates a schematic representation of a field emission propulsion system comprising several propulsion units.
Figure 2:
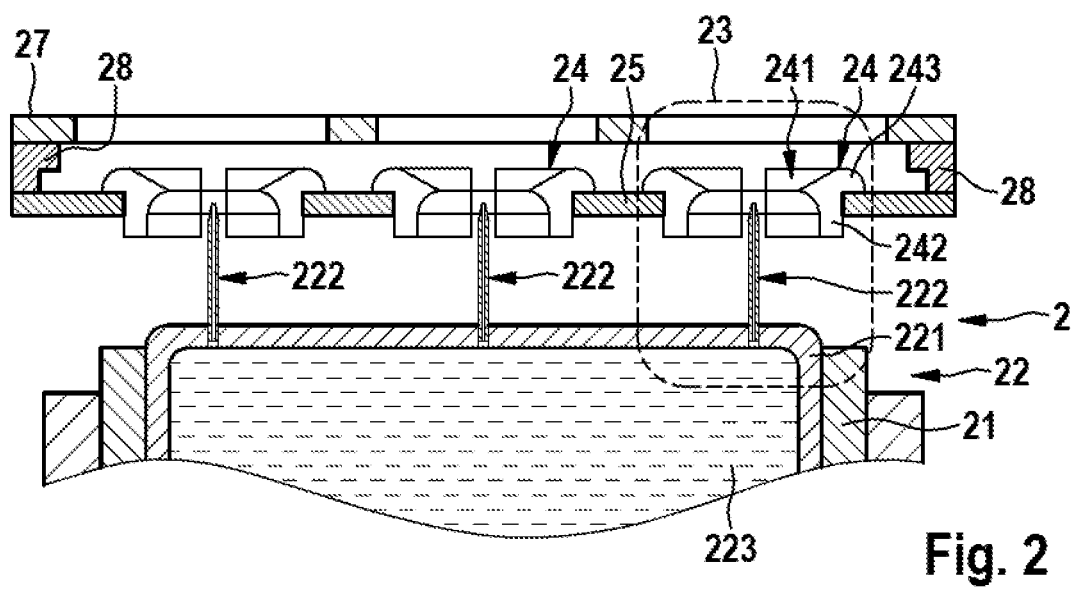
FIG. 2 illustrates a cross-sectional representation of propulsion units arranged side by side.

FIG. 1 schematically illustrates the structure of a field emission propulsion system 1 comprising a propulsion assembly 2, a neutralizer 3, and a control unit 4. FIG. 2 illustrates a detailed view of a section of the propulsion assembly 2.

As shown in more detail in the cross-sectional view of FIG. 2, propulsion assembly 2 comprises a heater unit 21 for an ion source 22, which comprises a fuel tank 221 with fuel 223 and an ion emitter 222 electrically and fluidly connected to it. The heating unit 21 serves to put the fuel in the fuel tank 221 into a liquid state and to keep it liquid. The heating unit 21 is supplied with power by means of a heating controller 41 as part of the control unit 4 and may be temperature controlled by this.

Figure 3:
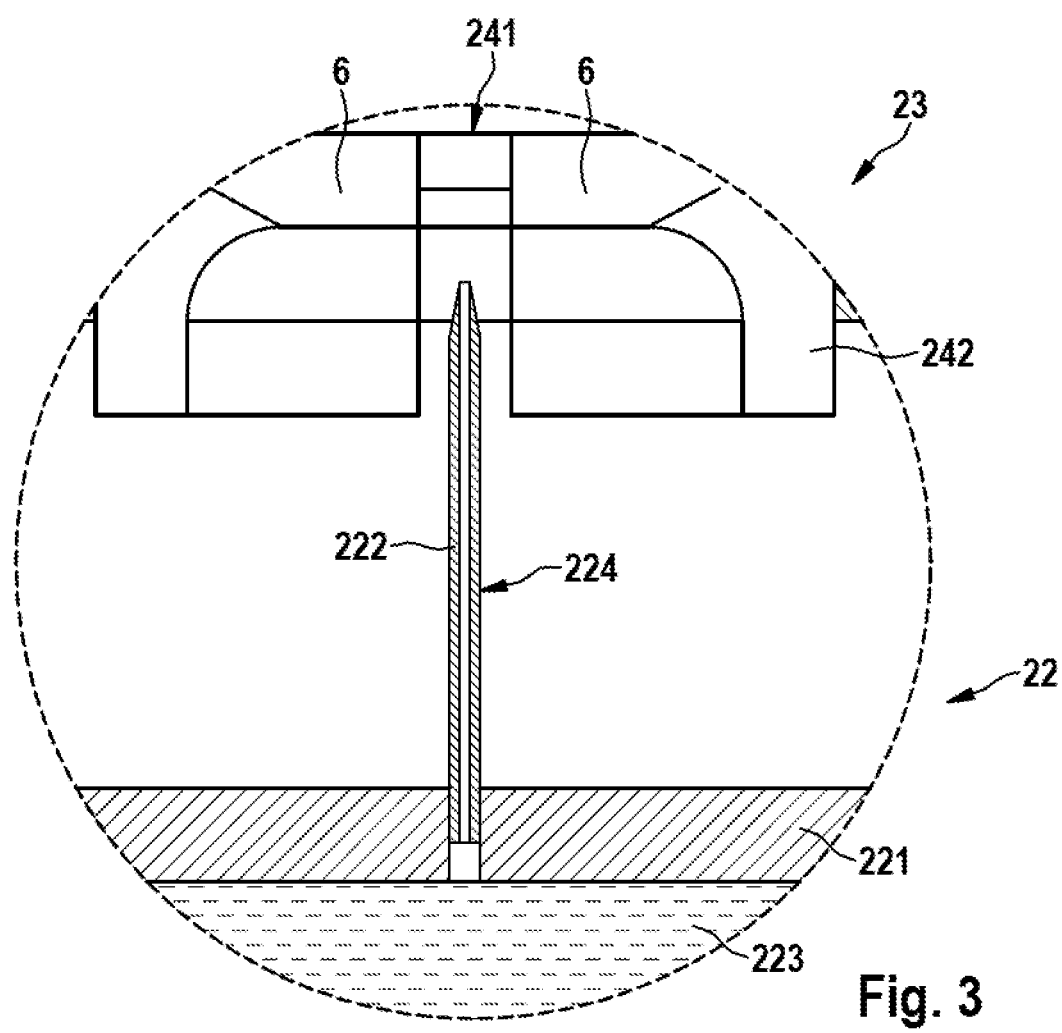
FIG. 3 illustrates a detailed cross-sectional representation of a propulsion unit.

The fuel tank 221 is made of an electrically conductive material such as tantalum, rhenium, tungsten, graphite or titanium. As shown in the more detailed cross-sectional view of propulsion units 23 in FIGS. 2 and 3, ion emitters 222 are configured with a tip, in particular needle-shaped, conical or pyramidal in shape, and comprise a device or configuration to pump liquid electrically conductive fuel 223 from fuel tank 221 for field ionization from ion emitter 222. In particular, a fluid line 224 running inside to the tip may be provided, which discharges the liquid electrically conductive fuel from the fuel tank 221 for field ionization from the ion emitter 222, e.g. supplied by the capillary effect. Alternatively, the ion emitters 222 may also be porous with a plurality of lines, wherein the fuel 223 may be supplied to the tip of the ion emitter 222 due to the open porosity. Ion emitters 222 may be formed of tantalum, tungsten, rhenium, titanium or other refractory i.e. high-melting metals.

The fuel is passed through the fluid lines 224 of the ion emitters 222 by means of a capillary effect. An electrically conductive liquid or a low-melting metal, such as gallium, indium, bismuth, lead, gold or similar, may be considered as the material for the fuel.

Above the tip of each of the ion emitters 222 there is a respective extractor electrode 24 having a central opening 241 substantially coaxial with the tip of the ion emitter 222. Extractor electrodes 24 are preferably supported by an extraction plate 25, and are electrically isolated from each other, e.g. by an extraction plate 25 formed of non-conductive material.

The fuel tank 221 is electrically connected to the ion emitters 222 and receives a high voltage potential from an emitter voltage supply source 42. The emitter voltage supply source 42 may be adjustable and sets the emitter voltage or the emitter voltage potential to a fixed value.

Extractor electrodes 24 are each individually connected to a controllable extractor electrode voltage source 43, which is part of control unit 4. The extractor electrode voltage sources 43 are individually adjustable in order to set an individual extractor electrode voltage and thus an individual electric field strength between the ion emitter 222 and the extractor electrode 24 for each of the propulsion units 23. As an alternative to separate extractor electrode voltage sources 43 for each of the extractor electrodes 24, a common extractor electrode voltage source 43 may be provided, wherein the different voltages for the extractor electrodes 24 may be set by means of correspondingly assigned voltage dividers. Other options for setting individual extractor electrode voltages for the extractor electrodes 24 are also conceivable.

The control unit 4 is especially configured to individually control the extractor electrode voltage or the extractor electrode potential of the extractor electrodes 24, such that the timings of ignition and the levels of ion emission may be controlled from the individual correspondingly assigned ion emitters 222. Thus, individual ion emitters 222 may be switched on or off and different emission currents may be controlled for each of the ion emitters 222. The potential difference between the emitter voltage potential and the extraction voltage potential is usually several +1000 volts.

Since due to the emitter ion current from positively charged fuel ions, which current is emitted from the propulsion units 23 during operation, the propulsion system 1 is charged negatively, an electron current is usually generated and emitted by means of the neutralizer 3. Neutralizer 3 may, for example, be configured as a field emission electron source or thermal electron source in a manner known per se. For this reason, the control unit 4 comprises a neutralizer control unit 45 which may control and supply power to the neutralizer 3 in a manner known per se, e.g. to keep the charge of the entire propulsion system 1 as neutral as possible.

Figure 4:
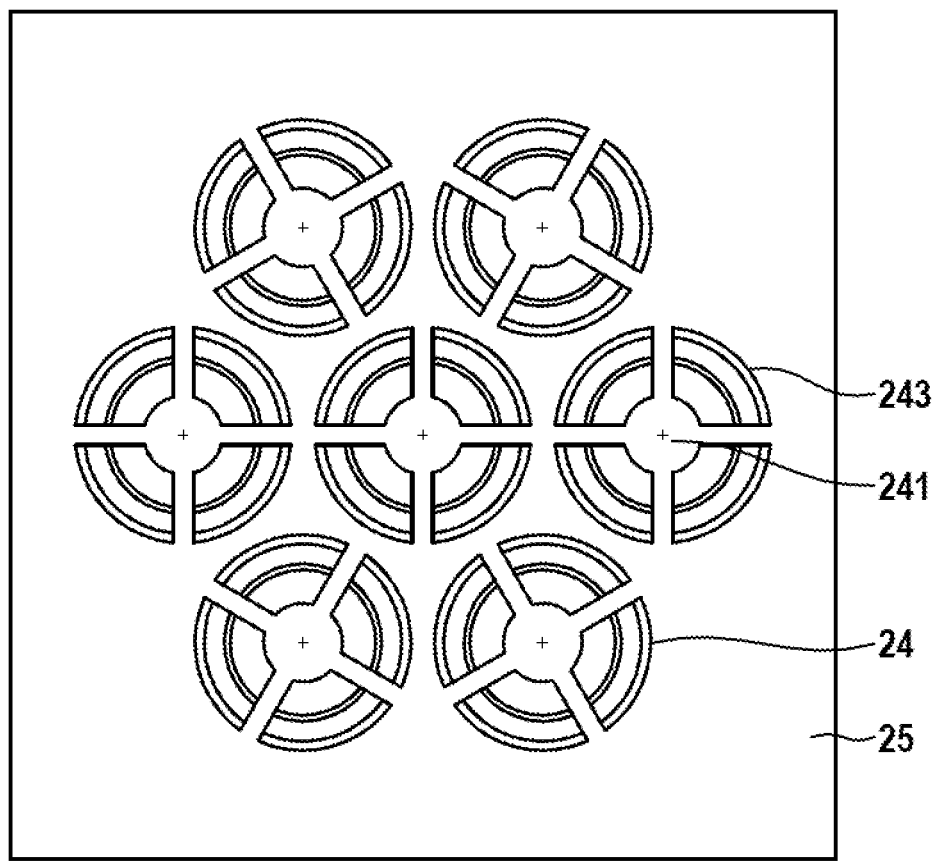
FIG. 4 illustrates a possible arrangement of the propulsion units of the propulsion system of FIG. 1.

FIG. 4 illustrates an arrangement of extractor electrodes 24 in a plan view. The extractor electrodes 24, for example, are arranged around and concentric to the ion emitter 222. In the center of the extractor electrodes 24 there are substantially round openings 241 which are arranged concentrically to the ion emitters 222 in order to emit the ion beam from the ion emitter 222. The arrangement of the extractor electrodes 24 may be provided as a field arrangement, wherein the extractor electrodes 24 are arranged in rows and are offset from each other to achieve the highest possible arrangement density.

The extractor electrodes 24 are connected to each other on the extraction plate 25, which retains the extractor electrodes 24 in position. The extraction plate 25 may be formed of electrically non-conductive material, or the extractor electrodes 24 may be mounted isolated on the extraction plate 25. One, at least one or each of the extractor electrodes 24 comprises an electrically conductive first shielding structure 242 projecting circumferentially in the direction of the ion emitter 222, which prevents, by the principle of shading, the continuous coating of one side of the extraction plate 25, which side is facing the ion emitters, with accumulating fuel material. This prevents the formation of an electrically conductive path between the individual extractor electrodes 24, and between the electrodes and the fuel tank 221 during operation, which would result in an electrical short circuit.

Alternatively or additionally, one, at least one, several or each of the extractor electrodes 24 may comprise an electrically conductive second shielding structure 245 projecting circumferentially in the direction of the ion beam to be emitted, which prevents, by the principle of shading, the continuous deposition of one side of the extraction plate 25, which side is facing away from the ion emitters 222, with accumulating fuel material. The second shielding structure 245 may be formed torus-like. This prevents the formation of an electrically conductive path between the individual extractor electrodes 24, and between the electrodes and the fuel tank 221 during operation, which would result in an electrical short circuit.

Furthermore, the extraction plate 25 may comprise, between the extractor electrodes 24, structures and/or recessed structures which are labyrinth-like or meander-like, i.e. projecting orthogonally to the surface direction of the extraction plate 25, which structures extend along the surface direction of the extraction plate 25, and thereby preventing, by the principle of shading, a continuous conductive coating during long-term operation by deposition of the fuel material. For example, a support between heating unit 21 and extraction plate 25 may have a corresponding labyrinth-like or meander-like form or steps which also prevent continuous coating by shading.

In addition, an electrically conductive cover plate 27 may optionally be mounted parallel to the extraction plate 25 on the side of the extraction plate 25 facing away from the ion emitters. In particular, the cover plate 27 comprises circular openings 271 which are located above the extractor electrodes 24 in the direction in which the ion emitters 222 and the extractor electrodes 25 are arranged and which, in particular, have the same or larger dimensions (e.g. radii) than the extractor electrodes 25 in the surface direction of the extraction plate 25. The cover plate 27 may be electrically isolated from the extractor electrodes 24. The electrical insulation between the cover plate 27 and the extractor electrodes 24 may be ensured by means of an electrically insulating spacer 28, which comprises labyrinth-like or meander-shaped structures, in order to protect the insulation as well in long-term operation against a continuous conductive coating by deposition of fuel. The provision of a cover plate 27 is advantageous, since it is possible to prevent particles in the environment from reaching the ion emitters 222 by applying a voltage potential. In addition, deposition of sputter particles or reflected fuel on the upper side of the extraction plate 25 may be prevented during prolonged operation.

During operation in space, the cover plate 27 may prevent the impact of a local surrounding plasma on the propulsion units 23. This prevents the attraction of e.g. free/thermal electrons from the surrounding plasma to the ion emitters 222, which electrons could damage the ion emitters. In addition, the voltage potential of the cover plate 27 prevents false measurement of emitter current by such a secondary electron current.

The control unit 4 also comprises a current measuring unit 44 to measure a current flowing to the extractor electrode voltage sources or from the neutralizer 3.

For operation of the propulsion system 1, it is desirable to set equal or defined thrust vectors of the ion beam from ion emitters 222. Due to component and assembly tolerances, different thrust vectors occur when the same extractor electrode voltages are applied.

Figure 5:
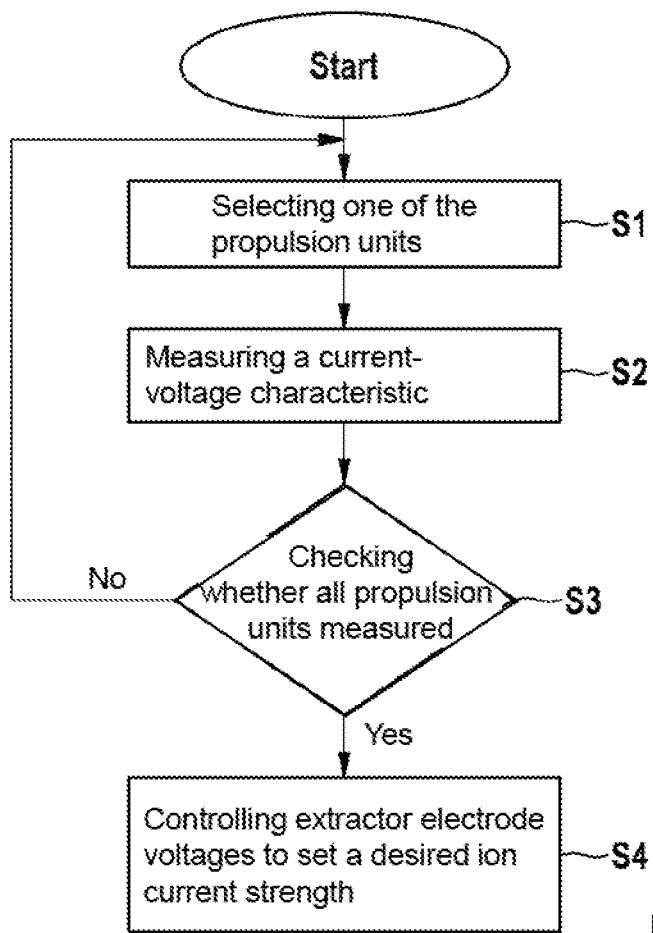
FIG. 5 is a flow chart illustrating a method for calibrating the propulsion units.

Therefore, a method is provided to control the strength of the ion beam in a defined way. This is performed by the defined individual adjustment of the field strength of the electric field between the ion emitters 222 and the respectively assigned extractor electrode 24 by varying the extractor electrode voltage or the extractor electrode voltage potential or the voltage difference between the extractor electrodes 24 and the associated ion emitters 222. To set the extractor electrode voltage, a method is provided as shown in the flow diagram of FIG. 5.

Figure 6:
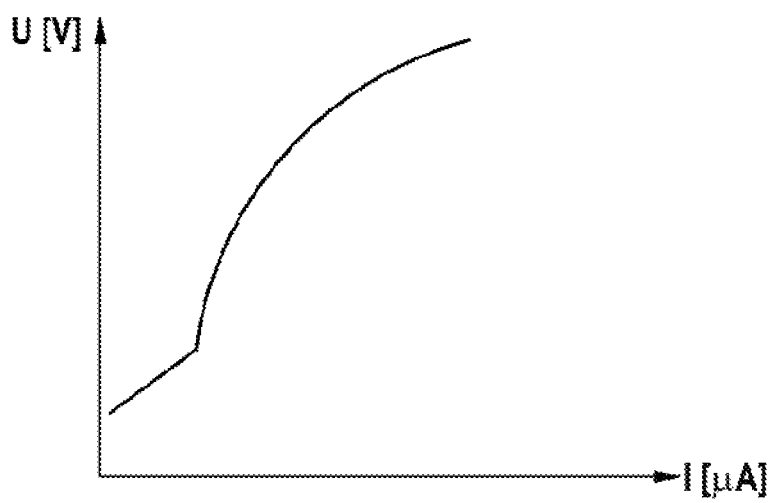
FIG. 6 is an exemplary current-voltage characteristic of a propulsion unit.

In step S1, one of the propulsion units 23 is selected. In step S2, a current-voltage characteristic graph is measured for the selected propulsion unit 23. The current-voltage characteristic represents a characteristic of a current flow across a voltage difference between the extractor electrode voltage potential and the emitter voltage potential of the respective propulsion unit 23, which occurs at a field strength in the respective propulsion unit 23 set by the extractor electrode voltage. The measurement is performed with the other propulsion units 23 deactivated or operating at constant (known) current (i.e. activated) and by means of the current measuring unit 44, which in this case measures the level of the ion current of all activated propulsion units 23. The ion current level is measured by measuring the electric current flowing from the emitter voltage supply source 42 or the electric current flowing into the ion source. The ion current of the propulsion unit 23 to be measured corresponds substantially to the measured electric current flowing into the ion source minus the known ion currents of the other propulsion units 23 (i.e. with the other propulsion units 23 activated). In other words, if the remaining propulsion units 23 are operated with a known current, the ion current of the respective propulsion unit 23 may be determined by subtracting the currents of the remaining propulsion units 23 from the detected current. If only the propulsion unit 23 to be measured is active for each measurement, the measured electric current corresponds to the ion current at the applied field strength or at the applied voltage difference between the emitter voltage potential and the extractor electrode voltage potential. Thus, a current-voltage characteristic may be determined for each of the propulsion units 23. FIG. 6 illustrates an example of such a current-voltage characteristic graph.

Step S3 checks whether all propulsion units 23 have been measured. If this is the case (alternative: Yes), the method continues with step S4, otherwise the system returns to step S1 and measures a next propulsion unit 23 that has not yet been measured. In this way, a current-voltage characteristic is recorded for each of the propulsion units 23.

In step S4, the extractor electrode voltages are controlled to set a field strength corresponding to a desired ion current strength for each of the propulsion units 23.

Figure 7:
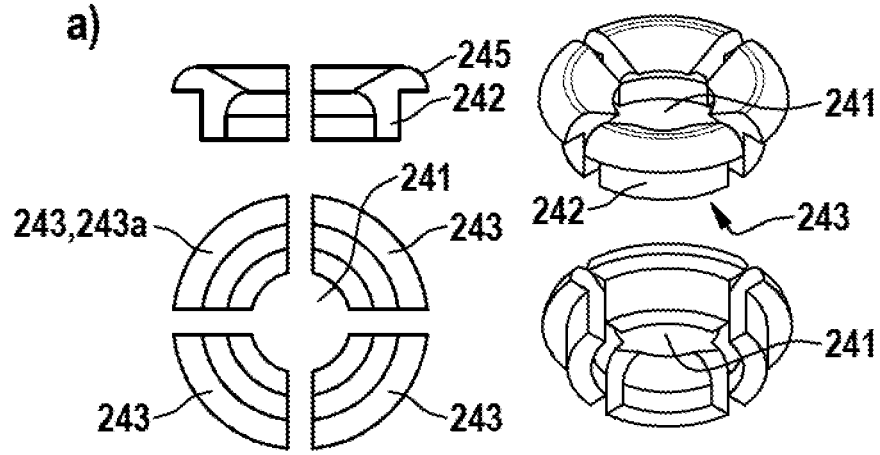
FIGS. 7a to 7c illustrate different perspective views of modifications of an extractor electrode segmentation.
Figure 7:
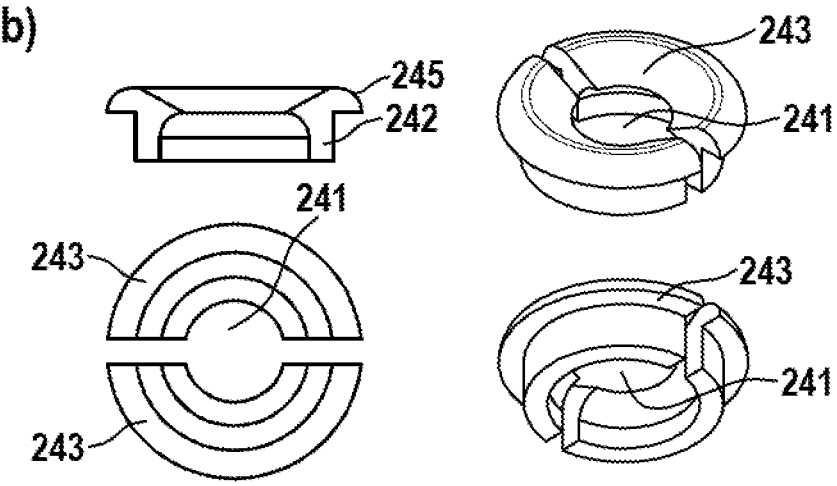
Figure 7:
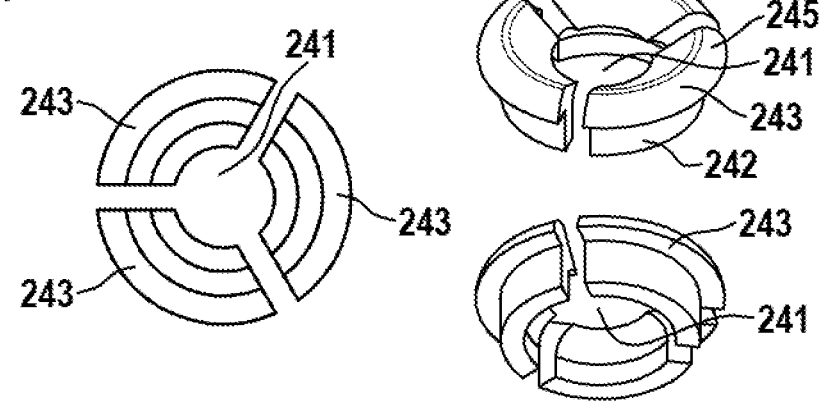

Further with reference to FIG. 4 and in conjunction with the different views of FIGS. 7a to 7c, the extractor electrodes 24 may be segmented, with extractor electrode segments 243 being electrically isolated from each other e.g. by spacing, and forming the circular extractor electrode 24 in the assembled state. It is possible to arrange the extractor electrode segments 243 according to the embodiments of FIGS. 7a to 7c, wherein the extractor electrodes 24 are segmented into four identical extractor electrode segments 243 (see FIG. 7a), into two identical extractor electrode segments 243 (see FIG. 7b) and into three extractor electrode segments 243 (see FIG. 7c). By varying the segment voltages at the individual extractor electrode segments 243 of an extractor electrode 24, an asymmetry of the ion beam emitted by the ion emitter 222, i.e. an inclination of the path of the ion beam with respect to the alignment between the ion emitter 222 and the extractor electrode 24, may be compensated. Such an asymmetry results from component tolerances and manufacturing tolerances of the propulsion units 23.

If the extractor electrodes are segmented, the above described calibration method may first be performed by applying the extractor electrode voltages required for the measurement to each of the extractor electrode segments.

An asymmetry may be determined, for example, during the calibration method or in a separate procedure. For this purpose, each of the extractor electrode segments 243 may be provided with a separate current measurement facility. While each of the propulsion units 23 is measured one after the other to determine the current-voltage characteristic such that an ion beam is formed, a parasitic current is measured through each of the extractor electrode segments 243 at one or more specific extractor electrode voltages. For example, the extractor electrode segment 243 through which the highest current flow is measured corresponds to the extractor electrode segment 243 which deflects the ion beam most strongly in its direction and which is, accordingly, arranged closest to the ion beam. The individual segment voltages may now be controlled based on the desired extractor electrode voltage (or the desired field strength).

By varying a segment voltage applied to part of the individual 243 extractor electrode segments of the propulsion unit 23, the direction of the ion beam may be varied as well, in addition to applying the extractor electrode voltage to the other 243 extractor electrode segments. For example, by iterative control of the segment voltages at the part of the extractor electrode segments 243, the direction of the ion beam may be adjusted to a desired direction, in particular the direction parallel to the arrangement direction between the ion emitter 222 and the extractor electrode 24. By iteratively controlling a part of the segment voltages based on the previously determined and set extractor electrode voltage, both the strength of the ion beam may be precisely controlled and the component and manufacturing tolerances of the propulsion unit 23 may be compensated.

Alternatively, all segment voltages may be varied by the extractor electrode voltage to be adjusted such that the mean value of the individual segment voltages corresponds approximately to the extractor electrode voltage.

For example, the control of the individual segment voltages or the direction of the ion beam may be performed using voltage dividers in particular, wherein the respective segment voltage is generated from the extractor electrode voltage. Thus, segment voltages may be generated by voltage dividers, also by adjustable voltage dividers, by the extractor electrode voltage source. A separate control with individual voltage sources for each extractor electrode segment is also possible.

If, for example, in the embodiment of FIG. 7a, a high current flow, compared to the currents in the other extractor electrode segments 243 through one of the extractor electrode segments 243a, is measured, the corresponding segment voltage from the extractor electrode voltage may be reduced by setting an adjustable electrical series resistor or by setting an adjustable voltage divider in order to achieve a higher attraction of the fuel ions of the ion beam through the other extractor electrode segments 243. As a result, the ion beam is deflected away from the respective extractor electrode segment 243a, as it is attracted more by the other extractor electrode segments 243. By suitably calibrating the variable series resistors assigned to the extractor electrode segments 243 or the voltage dividers assigned to the extractor electrode segments 243, the propulsion unit 23 may be calibrated accordingly. In this way, component tolerances of the extractor electrode 24 and alignment errors may be compensated, and the precision in the production and assembly of the extractor electrode segments 243 and the ion emitter 222 may be reduced.

The above described field emission propulsion system may be operated by separately controlling the propulsion units 23. The ion currents of the individual propulsion units 23 are determined according to a thrust vector control by specifying a thrust vector. The individual ion currents are each controlled by specifying a corresponding extractor electrode voltage resulting from the current/voltage characteristic, such that in addition to a total thrust strength resulting from the sum of the ion beams, a predetermined moment is also applied to the field emission propulsion system, which results from the arrangement of the individual propulsion units and the respective thrust strengths resulting from the respective ion beams.

The invention claimed is:

1. A field emission propulsion system for a spacecraft, comprising:
   a control unit;
   a propulsion assembly having a plurality of field emission propulsion units comprising an ion source, each of the plurality of field emission propulsion units having:
   a plurality of ion emitters; and
   extractor electrodes associated with the plurality of ion emitters and electrically insulated from one another, the field emission propulsion units arranged in a field arrangement;
   a plurality of extractor electrode voltage sources, which are each assigned to a respective extractor electrode, wherein the control unit is, configured to control each voltage source of the plurality of the extractor electrode voltage sources so as to provide the respective extractor electrode with an individual extractor electrode voltage; and
   an extraction plate supporting the extractor electrodes and formed from non-conductive material.

2. The field emission propulsion system according to claim 1, having a current measuring unit which is configured to measure an electric current flowing from the plurality of ion emitters and/or into the extractor electrodes.

3. The field emission propulsion system according to claim 1, wherein the control unit is configured to control a field strength of an electric field between the plurality of ion emitters and a respective associated extractor electrode by determining a respective associated extractor electrode voltage corresponding to a predetermined level of an ion current, wherein the respective associated extractor electrode voltage is determined for a respective field emission propulsion unit, by measuring a current-voltage characteristic of the respective field emission propulsion unit by measuring an emitter current through the ion emitter, with other field emission propulsion units simultaneously being deactivated or simultaneously being operated at constant current, and wherein the respective associated extractor electrode voltage is set in such that an emitter current of the respective field emission propulsion unit is set to the predetermined level of the ion current.

4. The field emission propulsion system according to claim 1, wherein at least one of the extractor electrodes is annularly shaped and formed with two, three, four or more than four extractor electrode segments which are electrically insulated from each other, wherein the extractor electrode voltage source is configured to provide each of the extractor electrode segments with a respective individual segment voltage such that, a predetermined direction of an ion beam associated with the at least one of the extractor electrodes is controlled, and/or wherein separate segment voltage sources are provided for a plurality of the extractor electrode segments in order to provide each of the extractor electrode segments with an individual segment voltage such that the predetermined direction of the ion beam is adjusted.

5. The field emission propulsion system according to claim 4, wherein an adjustable series resistor or an adjustable voltage divider is assigned to each of the extractor electrode segments in order to generate the respective individual segment voltage from the extractor electrode voltage assigned to the respective extractor electrode.

6. The field emission propulsion system according to claim 1, wherein a neutralizer is provided to output an electron current of controllable magnitude.

7. The field emission propulsion system according to claim 1, wherein the propulsion assembly comprises an ion source having a fuel tank for a liquid or liquefiable electrically conductive fuel, wherein the liquid or liquefiable electrically conductive fuel can be ejected for field ionization at a tip of the ion emitter facing the respective extractor electrode.

8. The field emission propulsion system according to claim 1, wherein the extractor electrodes are of annular shape with a respective central opening which is arranged concentrically with an extension direction of a respective ion emitter among the plurality of ion emitters.

9. The field emission propulsion system according to claim 1, wherein the extractor electrode voltage sources each comprise an adjustable voltage divider to provide an adjustable extractor electrode voltage.

10. The field emission propulsion system according to claim 1, wherein one, at least one or each of the extractor electrodes comprises, along a full or partial circumference, an electrically conductive first shielding structure projecting in a direction of the plurality of ion emitters, and/or wherein one, at least one or each of the extractor electrodes comprises, along the full or partial circumference, an electrically conductive second shielding structure projecting in the direction facing away from the plurality of ion emitters.

11. A method for calibrating the field emission propulsion system according to claim 1, wherein a field strength of an electric field, between the plurality of ion emitters and the respectively associated extractor electrode, is adjustable for each field emission propulsion unit of the plurality of field emission propulsion units by adjusting a respective extractor electrode voltage corresponding to a predetermined ion current to be adjusted, wherein the respective extractor electrode voltage results from a current-voltage characteristic of a respective one of the plurality of field emission propulsion units and the predetermined ion current to be adjusted of a respective one of the plurality of field emission propulsion units, the method comprising the following steps:

for each field emission propulsion unit of the plurality of field emission propulsion units, measuring the current-voltage characteristic by measuring an emitter current through the respective plurality of ion emitters of the field emission propulsion unit, with remaining field emission propulsion units simultaneously deactivated or operated with constant current at different extractor electrode voltages; and controlling the respective extractor electrode voltages for each field emission propulsion unit of the plurality of field emission propulsion units depending respectively on the current-voltage characteristic and the predetermined ion current so as to produce an emitter current of the respective field emission propulsion units corresponding to the predetermined ion current to be adjusted.

12. The field emission propulsion system according to claim 4, wherein the extractor electrodes are of annular shape with a respective central opening which is arranged concentrically with an extension direction of a respective ion emitter of the plurality of ion emitters.

13. The field emission propulsion system according to claim 4, wherein the extractor electrodes are supported by an extraction plate and are electrically insulated from one another, wherein the extraction plate is formed from non-conductive material.

14. The field emission propulsion system according to claim 9, wherein the extractor electrodes are supported by an extraction plate and are electrically insulated from one another, wherein the extraction plate is formed from non-conductive material.

15. A method of operating a field emission propulsion system according to claim 1, wherein a field strength of an electric field between the plurality of ion emitters and the respective associated extractor electrode is adjustable for each field emission propulsion unit of the plurality of field emission propulsion units to an extractor electrode voltage corresponding to a predetermined ion current to be adjusted resulting from a current-voltage characteristic and the predetermined ion current to be adjusted of a respective one of the plurality of field emission propulsion units, wherein a predetermined thrust vector of the field emission propulsion system is adjusted by driving each field emission propulsion unit of the plurality of field emission propulsion units with the individual extractor electrode voltage such that the predetermined thrust vector results as a sum of the ion currents from the plurality of field emission propulsion units.

* * * * *

UNITED STATES PATENT AND TRADEMARK OFFICE
CERTIFICATE OF CORRECTION

| | |
|---|---|
| PATENT NO. | : 11,801,949 B2 |
| APPLICATION NO. | : 16/777079 |
| DATED | : February 23, 2021 |
| INVENTOR(S) | : Daniel Bock |

It is certified that error appears in the above-identified patent and that said Letters Patent is hereby corrected as shown below:

On the Title Page

At item (63) under the heading "Related U.S. Application Data", change the citation to:
"(63) Continuation of application No. PCT/EP2018/069251, filed on July 16, 2018."

Signed and Sealed this
Second Day of July, 2024

Katherine Kelly Vidal
*Director of the United States Patent and Trademark Office*